July 27, 1948. W. H. D. BROUSE 2,445,997
EQUALIZER FOR CABLE OPERATED CONTROLS
Filed May 21, 1945 2 Sheets-Sheet 1

Inventor.
William H. D. Brouse
by H. S. Dennison
atty.

July 27, 1948.  W. H. D. BROUSE  2,445,997

EQUALIZER FOR CABLE OPERATED CONTROLS

Filed May 21, 1945  2 Sheets-Sheet 2

Inventor.
William H. D. Brouse

Patented July 27, 1948

2,445,997

UNITED STATES PATENT OFFICE 2,445,997

EQUALIZER FOR CABLE OPERATED CONTROLS

William H. D. Brouse, Toronto, Ontario, Canada, assignor to Teleflex Limited, Toronto, Ontario, Canada Application May 21, 1945, Serial No. 594,837

4 Claims. (Cl. 74—501)

This invention relates to the operation of control devices arranged in positions spaced from the control station and is particularly applicable to the flap operating system of aircraft and the principal objects of the invention are to overcome the operating stiffness of such systems and to obviate variations in operating load resulting from varying expansion and contraction of the operating cables and the conductor system for same due to temperature changes, thereby providing a system with maximum operating efficiency and smoothness.

A further object is to provide a control system which will enable a quick and accurate adjustment following the removal of the cable from its conductors for periodic inspection or replacement.

A still further object is to provide complete automatic compensation of the effect of temperature changes.

The principal feature of the invention consists in the introduction into a cable control operating system of a differential gear for operating same thereby providing for the application of equal tension and compression loads to the cable and permitting compensation for the difference in length relationship due to the effects of temperature change.

In the accompanying drawings

Figure 1:
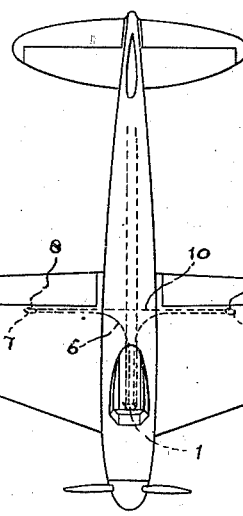
Figure 1 is a miniature plan view of an aircraft illustrating the application of cable controls to the control flaps.
Figure 2:
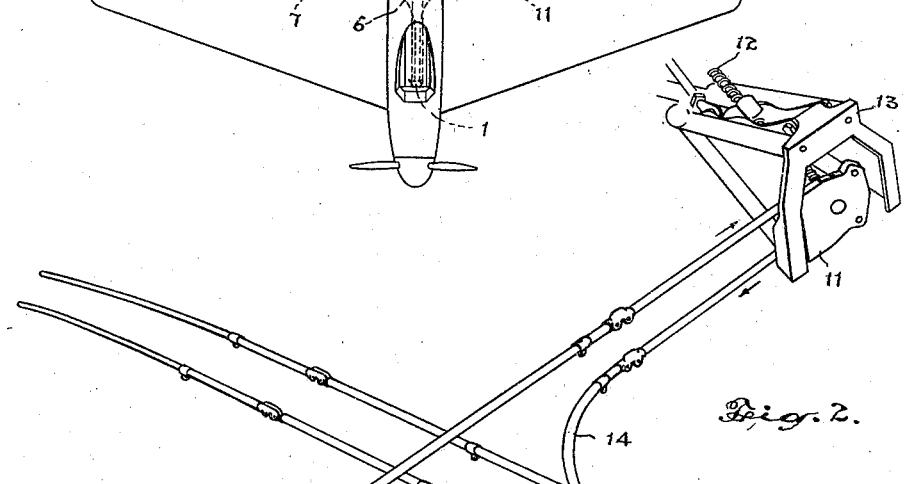
Figure 2 is a perspective view illustrating the flap control conductor system of an aircraft.
Figure 4:
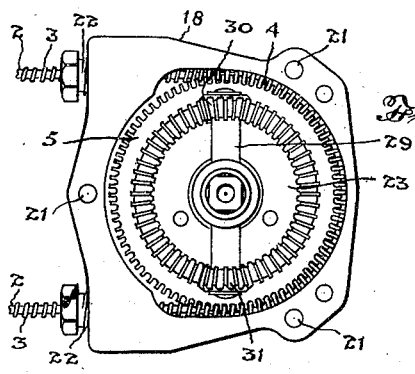
Figure 4 is a plan view of one section of the differential drive.
Figure 3:
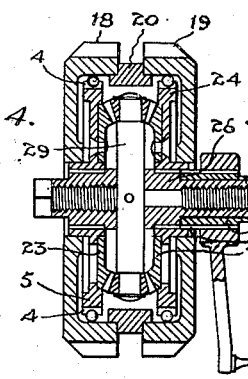
Figure 3 is an enlarged transverse sectional view taken through the driving axis of my improved differential cable drive gear.

In the layout of flap cable control as applied to an aircraft, as illustrated in Figures 1 and 2, the cable operating gear box 1 which encloses a pair of axially aligned cable engaging gears 5 and 24 is arranged in a suitable position available to the operator, the gears and cable being preferably of the type known as "Teleflex" in which the cable 2 of flexible steel has wound thereon a uniformly spaced spiral wire 3 which fits between the peripheral teeth 4 of the said gears, the periphery of which is grooved to receive and guide the flexible cable.

The geometry of the layout is that the cable 2 passes around the upper gear 5 of the pair mounted in the box 1 and is conducted through the curved tube 6 to the gear box 7 arranged on one wing of the aircraft and is operatively connected to the screw jack 8 of the flap operating unit 9 on said wing.

A straight tube 10 extending along the rear wing spar connects the gear box 7 with the gear box 11 arranged on the opposite wing and the cable is operatively connected with the screw jack 12 of the flap operating unit 13 on the latter wing.

A curved tube 14 connects the gear box 11 with the lower part of the gear box 1 and the cable passes around the lower gear housed therein.

The terminal end of the cable passing around the upper gear 5 of the control box 1 extends into and is housed in the tube 15 and the other terminal end extending from the lower gear 24 extends into and is housed in the tube 17, the said tubes 15 and 17 merely serving to enclose the free ends of the cable.

The gear box 1 is formed of two similar sections 18 and 19 having open inner faces nesting against a closing ring section 20 and the three sections are clamped together by bolts extending through rim holes 21. Bushings 22 are secured to the sections 18 and 19 with their axes tangential to the toothed peripheries of the toothed gears 5 and 24 arranged within the box 1. The ends of the tubular conductors 6, 15, 14 and 17 enclosing the cable entering the gear box 1 are secured in these bushings.

Rotatably mounted in a journal opening in the gear box section 18 is the gear wheel 5, the perimeter of which is formed with the teeth 4 to mesh with the spaced turns of the spirally wound wire 3 on the cable 2.

A bevel gear 23 is formed on or secured to the inward face of the gear wheel 5.

The gear wheel 24 similar to the gear wheel 5 is rotatably mounted in a journal opening in the section 19 of the gear box 1 and its axis is aligned with the axis of the gear 5. The gear 24 has formed on or secured to the inward face a bevel gear 25 similar to the gear 23. The journal orifice of the gear 24 is formed with longitudinal keyways 24'.

A spindle 26 is mounted axially to rotate within the gear wheels 5 and 24 and one end of same is formed with a squared portion 27 adapted to fit into and interlock with the squared orifice extending through a bushing 28 mounted thereon. This bushing is splined externally for part of its length to engage a splined orifice in the gear 24 to rotate same but the splines do not extend the full length of the bushing, consequently when the bushing is reversed and the unsplined end is inserted in the gear, said gear will turn independent of the bushing.

Extending transversely through or otherwise secured to the spindle 26 is a cross spindle 29 arranged midway between the inward faces of the bevel gears 23 and 25 and pinions 30 and 31 which are journalled on the ends thereof are in constant mesh with the said bevel gears.

It will be understood that the cable 2 is looped around each of the gears 5 and 24 and it will be apparent that the rotation of the spindle 26 will, through its transverse spindle 29 and the pinions intermeshing with the bevel gears carried by the gears 5 and 24, rotate both gears simultaneously and as these gears rotate they simultaneously apply tension to the section of the cable entering the gear box and compression to the section leaving the gear box.

Ordinarily with cable controlled systems both driving gears are attached to a common shaft and consequently there can be no relative movement between said gears which are applying the driving loads, one pulling and one pushing. With such conditions of load it is important that the length relationship between the cable and the conducting conduits remain fixed so that both tension and compression loads shall be applied to the cable simultaneously.

The cable is necessarily constructed of steel and the conductor conduit will be of an aluminum alloy, brass or similar material having a considerably different co-efficient of expansion from that of steel.

It will be appreciated that a drop in temperature will result in a greater shortening of the effective length of the conductor conduit than the cable, consequently the system will be subjected to excessive compression and conversely with a rise of temperature the system will be subjected to excessive strain. These conditions result in very unstable conditions which cause binding or stiffness in operation and undesirable variation in operating load.

The present invention by the very simple expedient of introducing into the operating mechanism of a cable control system a differential gear mechanism, immediately relieves the excess tension or compression through the ability of the driving gears to rotate relative to one another so that the excess material in either the cable or the conductor conduit will be compensated for and there will be an equalized load at all times.

Figure 6:
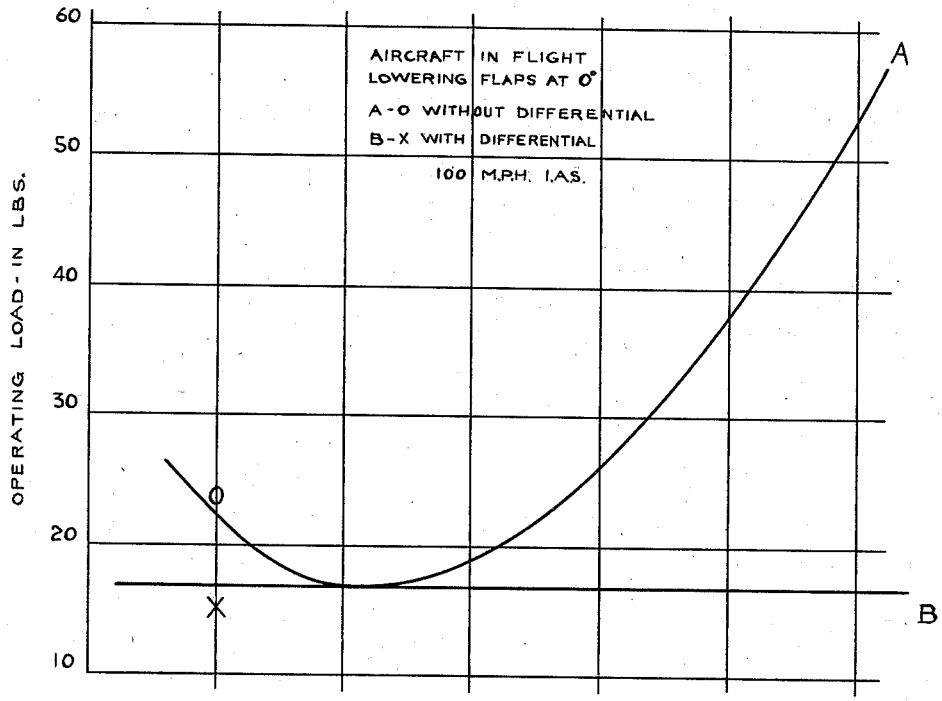
Figure 6 is a graph illustrating the curves of operating loads required in lowering the flaps at 0° of an aircraft in flight without and with the use of the differential gear.
Figure 7:
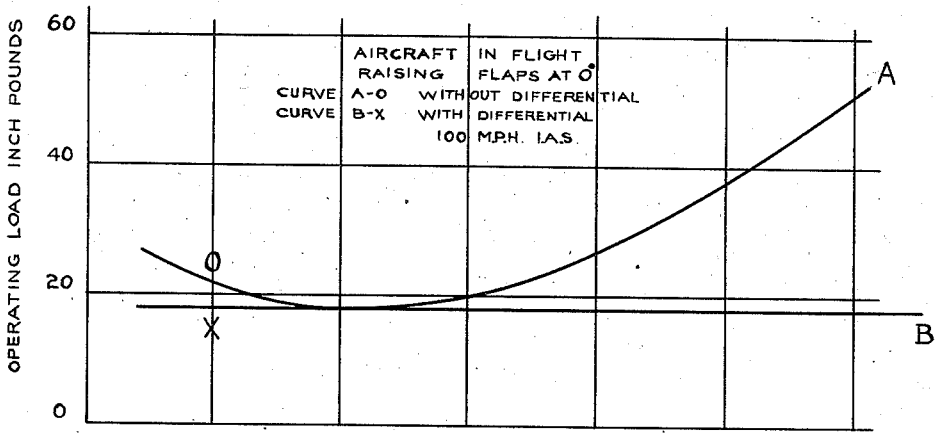
Figure 7 is a graph illustrating the curves of operating loads required in raising the flaps at 0° of an aircraft in flight without and with the use of the differential gear.
Figure 5:
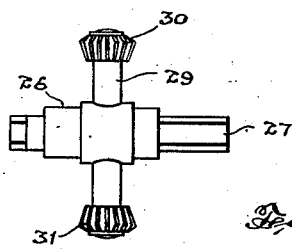
Figure 5 is an elevational detail view of the drive gear operating spindle.

The practical application of this invention will be at once apparent on examination of the graph curves shown in Figures 6 and 7 which illustrate the difference in operating load in a 40° difference in temperature range without the use of the automatic differential gear adjustment which the use of the differential eliminates.

A further feature of importance is that in the setting up of a cable control where no differential is used a certain amount of compression is built up due to the fact that it is necessary to use one driving gear to push the full length of cable through the system until it returns to the final driving box and engages in the cable gear therein.

It is impossible to be certain that engagement is not made between the gears and cable with this compression inherent in the cable, with the result that the final driving gear will not operate in tension to the extent intended.

If it is assumed that the desired condition is achieved and that one driving gear does act on the cable to produce compression and the other to produce tension it will however be understood that the length relationship is critical and will be upset by temperature change.

The use of the differential driving gear as described automatically ensures equal tension and compression loads to the cable by each of the two driving gears and therefore prevents initial compression from causing an inefficiently operating system.

In the maintenance of aircraft it is necessary to remove the control cable periodically for inspection purposes and it has been found that considerable manipulation requiring extensive experience is necessary in the previous forms of controls in order to ensure the least possible compression in the control cable but the introduction of the differential drive herein described eliminates this delicate and uncertain condition and the cable may be inserted in a simple threading operation and the differential gears automatically adjust the cable to its most efficient operating position.

In assembling the operating cable one end is inserted into the gear box 1 to mesh with the peripheral teeth of the gear 5. The splined bushing 28 is reversed so that the outer splined surface locks with the splined orifice of the gear 24 and as the bushing is formed with a squared orifice to engage the squared external end of the spindle 27 the spindle and gears are thus locked together and the turning of the crank mounted on the bushing 28 operates the gears 5 and 24 in unison and the cable engaged thereby is drawn into position by the gears and pushed through the conductor tubing. After the cable has been thus located in the conductor tubes the bushing is reversed so that the gear 24 will not be locked to the spindle and it will therefore operate independently of the spindle allowing the differential to operate freely so that when the operator turns the gears any difference in the length of either of the conductor tubes through expansion or contraction will be automatically compensated.

What I claim as my invention is:

1. An equalizer for cable operated controls, comprising the combination with a gear operated cable slidable in an enclosing conduit and controls engaging same intermediate of its length, of a pair of co-axially journalled gears meshing with spaced lengths of cable, and freely rotatable differential means for driving said gears to push or pull said cable lengths and equalize the compression or tension loads applied thereto in operating the controls.

2. In a device as claimed in claim 1, means for locking said differential gear driving means from differential operation to push the cable through the cable conduit under uniform pressure.

3. An equalizer for cable operated controls, comprising the combination with a gear operated cable slidable in an enclosing conduit and controls engaging same intermediate of its length, of a gear casing, cable engaging gears journalled co-axially in said casing and having bevel gear surfaces facing inwardly, one of said gears having longitudinal keyways in its journal surface, a driving shaft extending through said gears, a spindle mounted transversely of said shaft between said gears, bevel pinions mounted on said spindle and meshing with said bevel gears, a bushing non-rotatably mounted on said shaft and having longitudinal splines to engage the keyways of said gear to lock said gear to rotate with said shaft, said bushing having one end formed without splines and when reversed to permit the rotation of the spline-engaging gear to turn freely, and a handle secured to said bushing to rotate said bushing and the shaft.

4. In an aeroplane flap control, the combination with jacks for operating said flaps having cable operated gears enclosed in casings, of a conduit connecting said jack gear casings, an operating gear casing, a pair of cable-operating gears co-axially mounted in said operating casing, a conduit extending from one of said jack gear casings to said operating gear casing to direct the cable around one of said gears, a conduit extending from the other of said jack gear casings to said operating gear casings to direct the cable around the other of said operating gears, conduits leading from said operating gear casing to enclose the ends of said cable, and differential means arranged co-axial with said operating gears for driving said gears in either direction.

WILLIAM H. D. BROUSE.

REFERENCES CITED

The following references are of record in the file of this patent:

UNITED STATES PATENTS

| Number | Name | Date |
| --- | --- | --- |
| 1,974,361 | La Neve | Sept. 18, 1934 |

FOREIGN PATENTS

| Number | Country | Date |
| --- | --- | --- |
| 510,013 | Great Britain | July 25, 1939 |
| 546,430 | Great Britain | Jan. 2, 1942 |